US009571860B2

United States Patent
Sze et al.

(10) Patent No.: US 9,571,860 B2
(45) Date of Patent: Feb. 14, 2017

(54) DIAGONAL SCAN FOR PARALLEL CODING AND DECODING OF SIGNIFICANCE MAP AND TRANSFORM COEFFICENTS

(71) Applicant: TEXAS INSTRUMENTS INCORPORATED, Dallas, TX (US)

(72) Inventors: Vivienne Sze, Cambridge, MA (US); Madhukar Budagavi, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 14/874,100

(22) Filed: Oct. 2, 2015

(65) Prior Publication Data

US 2016/0100192 A1   Apr. 7, 2016

Related U.S. Application Data

(63) Continuation of application No. 13/250,689, filed on Sep. 30, 2011, now Pat. No. 9,154,801.

(60) Provisional application No. 61/388,512, filed on Sep. 30, 2010, provisional application No. 61/390,083, filed on Oct. 5, 2010, provisional application No. 61/391,907, filed on Oct. 11, 2010, provisional application No. 61/430,721, filed on Jan. 7, 2011, provisional application No. 61/454,679, filed on Mar. 21, 2011.

(51) Int. Cl.
H04N 19/61    (2014.01)
H04N 19/13    (2014.01)
H04N 19/43    (2014.01)

(52) U.S. Cl.
CPC .............. *H04N 19/61* (2014.11); *H04N 19/13* (2014.11); *H04N 19/43* (2014.11)

(58) Field of Classification Search
CPC ..................................................... H04N 19/61
See application file for complete search history.

(56) References Cited

U.S. PATENT DOCUMENTS

2008/0046698 A1    2/2008  Ahuja et al.
2008/0310512 A1*  12/2008  Ye ..................... H04N 19/00812
                                                               375/240.16

(Continued)

OTHER PUBLICATIONS

Vivienne Sze et al. "Parallelization of HHI Transform Coding" Oct. 2010, Guangzhou, China.

(Continued)

*Primary Examiner* — Dave Czekaj
*Assistant Examiner* — Berteau Joisil
(74) *Attorney, Agent, or Firm* — Charles A. Brill; Frank D. Cimino

(57) ABSTRACT

A method and apparatus for encoding bit code utilizing context dependency simplification to reduce dependent scans. The method includes retrieving at least one 2 dimensional array of transform coefficient, transforming the at least one 2 dimensional array of transform coefficient to a 1 dimensional coefficient scanning using a diagonal scan in a fixed direction, utilizing the at least one 1 dimensional array of transform coefficients for context selection based on fewer than 11 neighbors, potentially selected based on scan direction, slice type, coding unit type and binarization, and performing arithmetic coding to generate coded bit utilizing context selection and binarization.

4 Claims, 5 Drawing Sheets

(56) References Cited

U.S. PATENT DOCUMENTS

2009/0201995 A1* 8/2009 Schwarz ............. H03M 7/4006
375/240.18
2009/0232204 A1* 9/2009 Lee ...................... H04N 19/176
375/240.02

OTHER PUBLICATIONS

Vivienne Sze et al. "CE11: Parallelization of HHI Transform Coding (Fixed Diagonal Scan from C227)" Jul. 2011, Torino, Italy.

* cited by examiner

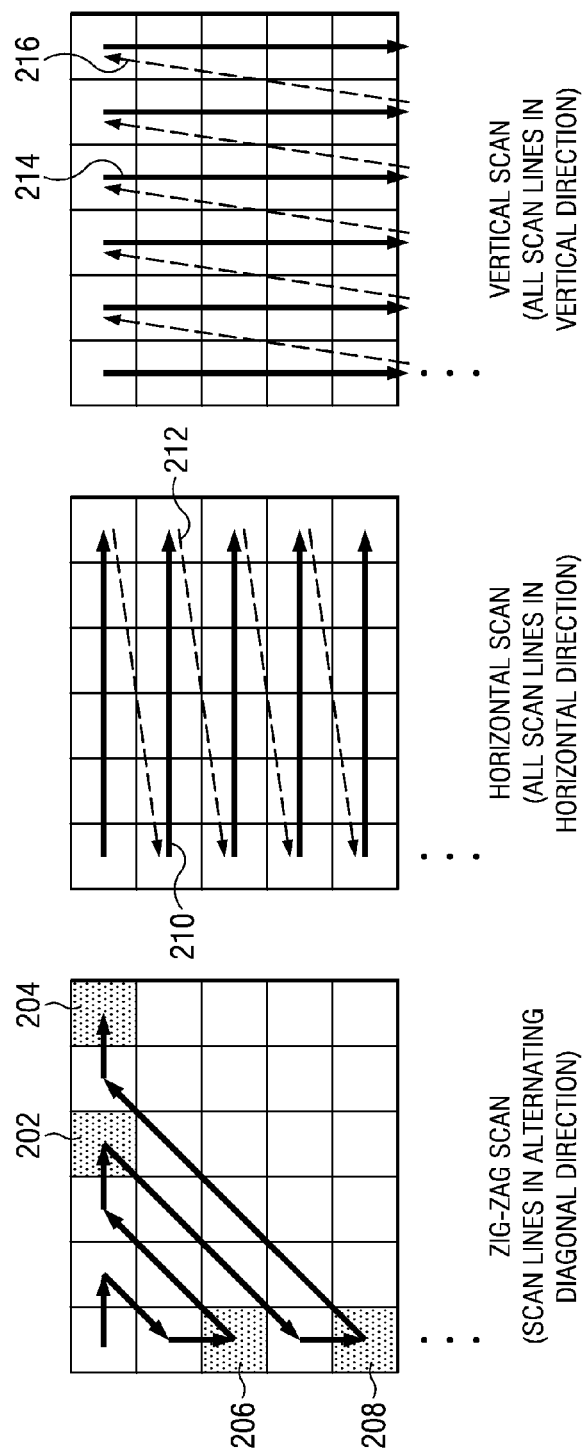

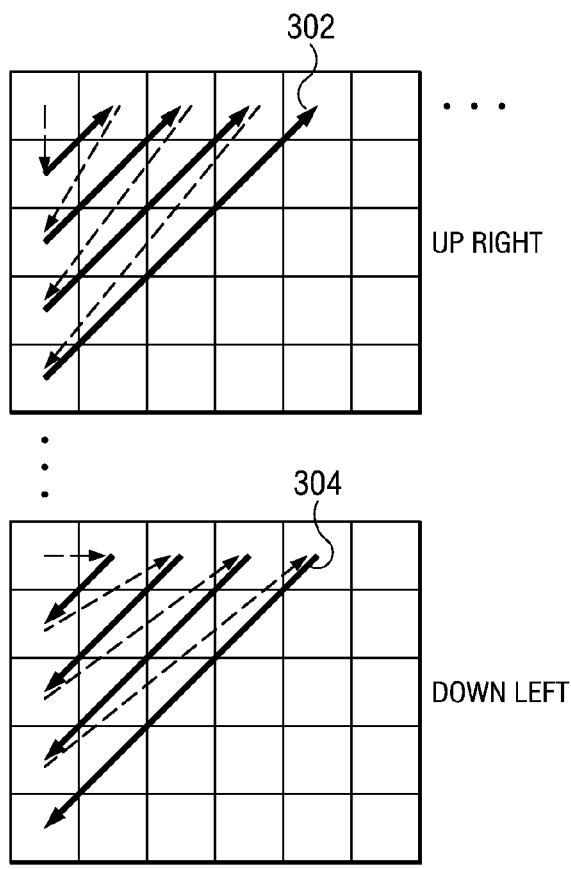
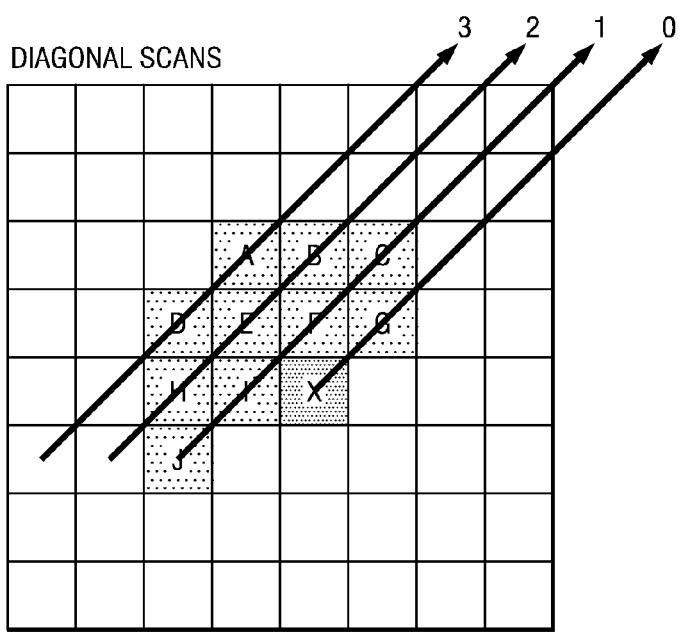
FIG. 3
FIG. 4

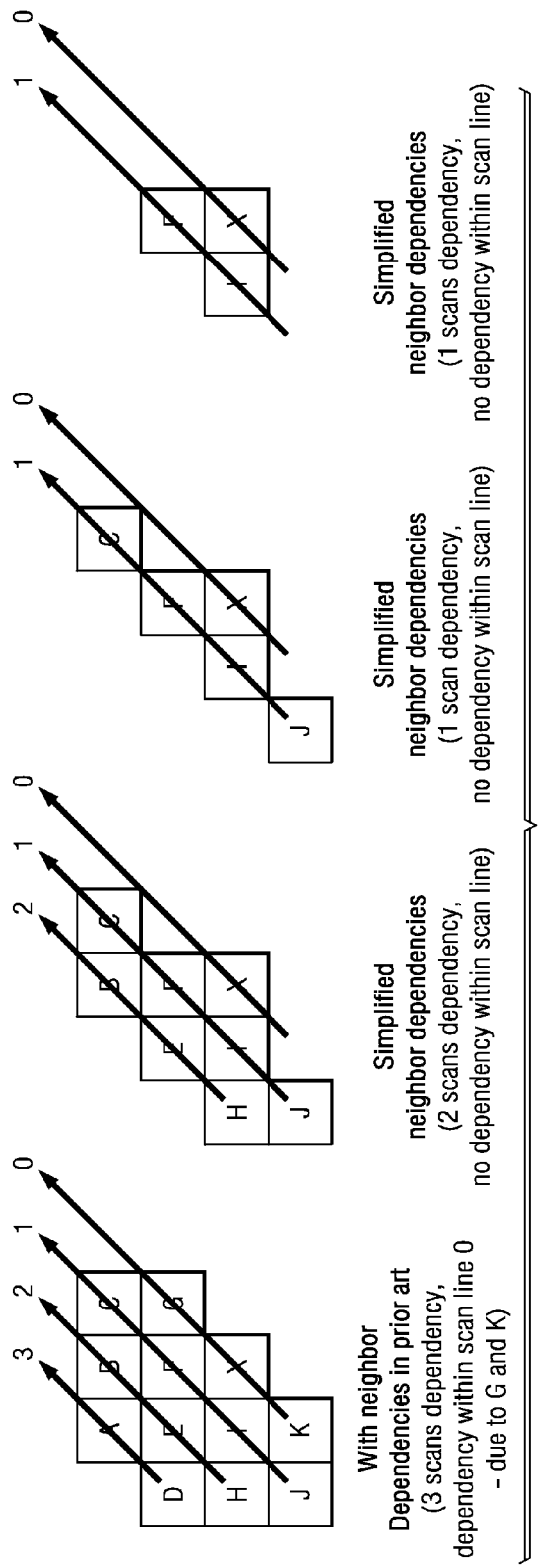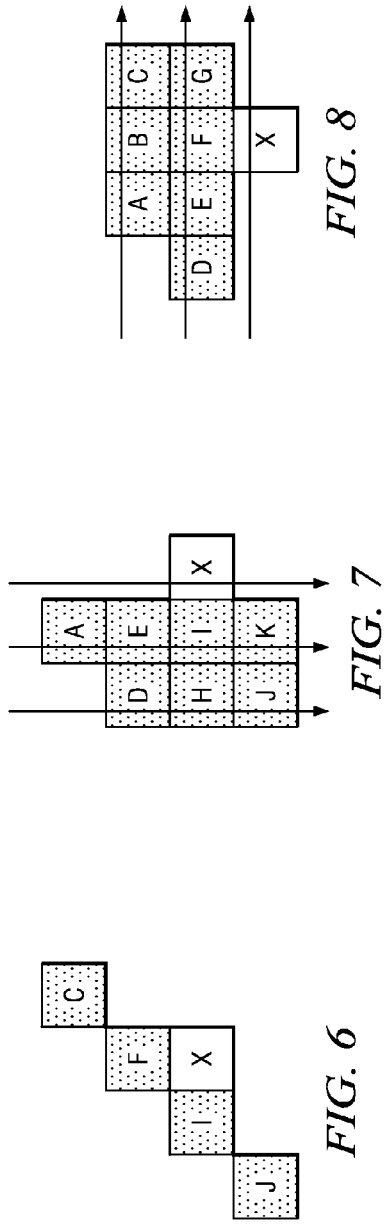
FIG. 5
FIG. 6
FIG. 7
FIG. 8

DIAGONAL SCAN FOR PARALLEL CODING AND DECODING OF SIGNIFICANCE MAP AND TRANSFORM COEFFICENTS

CROSS-REFERENCE TO RELATED APPLICATIONS

This application is a continuation of application Ser. No. 13/250,689, filed Sep. 30, 2011 (now U.S. Pat. No. 9,154, 801), which claims the benefit of Application No. 61/388, 512, filed Sep. 30, 2010, Application No. 61/390,083, filed Oct. 5, 2010, Application No. 61/391,907, filed Oct. 11, 2010, Application No. 61/430,721, filed Jan. 7, 2011, and Application No. 61/454,679, filed Mar. 21, 2011, which are herein incorporated by reference.

BACKGROUND OF THE INVENTION

Field of the Invention

Embodiments of the present invention generally relate to a method and apparatus for diagonal scan in a fixed direction and simplified context selection for parallel entropy coding of significance map of transform coefficients.

Description of the Related Art

In video coding standards, context modeling is a popular approach used in entropy coding to improve coding efficiency. Context modeling involves selecting a context which determines the probability used to encode binary symbols. The context selection is difficult to parallelize. It is particularly difficult at the decoder when there are too many factors that impact the selection, such as, values of other binary symbols affecting the context selection. However, such dependencies tend to provide better coding efficiency. Parallel processing is important for high performance, for example, for processing throughput, and for reducing power consumption, such as, reducing the frequency requirement or operational voltage.

Therefore, there is a need to improve parallel processing capabilities during entropy coding of transform information, while simultaneously maintaining high coding efficiency.

SUMMARY OF THE INVENTION

Embodiments of the present invention relate to a method and apparatus for a method and apparatus for encoding bit code utilizing context dependency simplification to reduce dependent scans. The method includes retrieving at least one 2 dimensional array of transform coefficient, transforming the at least one 2 dimensional array of transform coefficient to a 1 dimensional coefficient scanning using a diagonal scan in a fixed direction, utilizing the at least one 1 dimensional array of transform coefficients for context selection based on fewer than 11 neighbors, potentially selected based on scan direction, slice type, coding unit type and binarization, and performing arithmetic coding to generate coded bit utilizing context selection and binarization.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 1 is an embodiment of prior art context selection;

FIG. 2 is an embodiment of prior art scan order in zig-zag to map 2 dimension array of transform coefficients to 1 dimension array of transform coefficients;

FIG. 3 is an embodiment of scan order in diagonal scan in fixed direction to map 2 dimension array of transform coefficients to 1 dimension array of transform coefficients.

FIG. 4 shows how diagonal scan aligned with neighboring coefficient positions, whose values affect the context selection.

FIG. 5 is an embodiment of a context dependency simplification with no dependencies within the same scan reducing dependencies on neighbors in different scan lines;

FIG. 6 is an embodiment of a context dependency simplification to reduce neighboring dependency from 11 to 4;

FIG. 7 is an embodiment of context dependency simplification for vertical scan to enable parallel processing within vertical scan line;

FIG. 8 is an embodiment of a context dependency simplification for horizontal scan to enable parallel processing within horizontal scan line;

DETAILED DESCRIPTION

Figure 9:
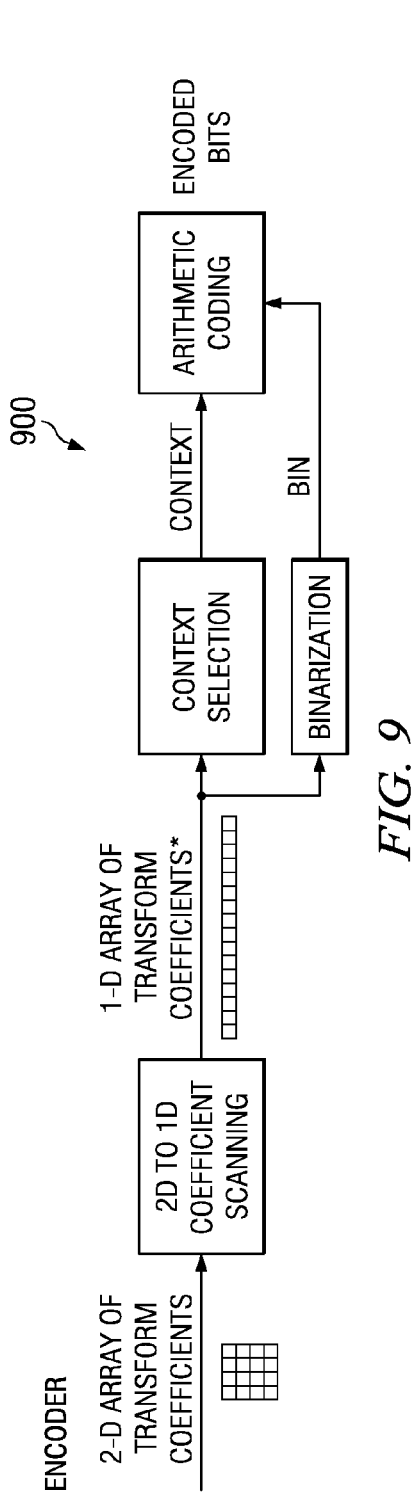
FIG. 9 is a flow diagram depicting an embodiment of a method for encoding bit code utilizing the diagonal scan in fixed direction along with context dependency simplification to reduce the dependencies to enable parallel context processing.

This disclosure focuses on diagonal scanning of significance map of the transform coefficients and reducing neighbor dependency during context selection. This disclosure utilizes the binary symbols that represent the significance map of the transform. The significance map indicates the location of the non-zero transform coefficients. For improved coding efficiency, the context selection can depend on the value of the coefficients in neighboring positions in the transform, typically in the left, top-left and top directions.

In one embodiment, the transform coefficients and its significance map, indicating the locations of the non-zero coefficients, are encoded/decoded and are provided in 2 dimensional format from the transform module. In addition, the position of non-zero coefficients may be transmitted in terms of significance map, for example, utilizing syntax elements: significant_coeff_flag, last_significant_coeff_x, last_significant_coeff_y, etc. Furthermore, coefficients values may be transmitted, for example, utilizing syntax elements: coeff_abs_level_greater1_flag, coeff_abs_level_greater2_flag, coeff_abs_level_minus3, coeff_sign_flag, etc.

FIG. 1 is an embodiment of prior art context selection for the significance map. In FIG. 1, the context for the significant coefficient flag for position X can depend on 11 neighboring positions (A, B, C, D, E, F, G, H, I, J and K). In one embodiment, only one of the G or K will be required, depending on the direction of the scan. With such dependency, it is difficult to select the context to decode multiple bins of different positions at the same time. This is especially difficult when the traditional approach of zig-zag scan is used, as shown in FIG. 2.

FIG. 2 is an embodiment of dependencies of context selection for map for coding efficiency with traditional zig-zag orders. If zig-zag scan is used, as shown in FIG. 2, for positions at the edge of the transform, highlighted in grey, the context selection will depend on previously decoded position which makes parallel processing difficult. FIG. 2 is an embodiment of prior art scan order to map 2 dimension array of transform coefficients to 1 dimension array of significance map of the transform coefficients; scan directions include zig-zag scan, horizontal scan and vertical scan; for zig-zag, scan the direction of the scan line changes at the edge of the 2 dimension array.

For zig-zag scan, the direction of the scan line changes at the edge of the 2 dimension array. If zig-zag scan is used, as shown in FIG. 2, for positions at the edge of the transform, highlighted in blue, the context selection will depend on previously decoded position which makes parallel processing difficult. FIG. 2 also shows the other scan directions used include vertical and horizontal scans. The solid line show the scan line and direction; while the dotted line shows how when the scan line reaches the edge of the 2 dimension array, the next position is the beginning of the next scan line usually at the opposite edge (for vertical scan, when the bottom edge is reached by the scan line, the next position is the top edge of the next scan line; for horizontal scan, when the right edge is reached by the scan line, the next position is the left edge of the next scan line).

FIG. 3 is an embodiment of dependencies of context selection for significant map for improved coding efficiency with different scanning orders. Rather than using the traditional zig-zag scan of FIG. 2, a diagonal scan in a fixed direction approach may be utilized. With a diagonal scan, all scan lines are processed in the same direction (either upright or down-left) as shown in FIG. 3. The solid line show the scan line and direction; while the dotted line shows how when the scan line reaches the edge of the 2 dimension array, the next position is the beginning of the next scan line usually at the opposite edge (for up-right scan, when the top edge is reached by the scan line, the next position is the left edge of the next scan line; for down-left scan, when the left edge is reached by the scan line, the next position is the top edge of the next scan line). Using diagonal scan in fixed direction avoids this dependency at the edges (highlighted in FIG. 2) which occur for zig-zag scan.

Using diagonal scan in fixed direction avoids this dependency at the edges, highlighted in FIG. 2, which occur for zig-zag scan. A diagonal scan in fixed direction relates to a diagonal scan where the arrow point to the same direction, i.e. from upper right to lower left, from lower left to upper right and the like. In one embodiment, all diagonal scans may be in the same direction, all up-right or all down-left. The direction of the fixed directional scan may depend on the location of the last significant coefficient. Hence, if the position of the last significant coefficient is known, it may be used to select the scan direction. Thus, the diagonals can be processed in parallel and still satisfy the top, left, and top-left dependencies, as shown in FIG. 1.

FIG. 3 is an embodiment of scan order (diagonal scan in fixed direction) to map 2 dimension array of significance map of the transform coefficients to 1 dimension array of significance map of the transform coefficients; all scan line are processed in the same direction (either up-right or down-left); the diagonal scan in fixed direction is used to replace zig-zag scan in FIG. 2.

FIG. 4 is an embodiment of dependencies of context selection for significant map for improved coding efficiency with various types of scans. In one embodiment, if while processing position X, dependencies on G and K are removed, then this eliminates dependency on previously decoded position, which is favorable for parallel processing. Furthermore, context selection for scan line 0 can begin in parallel as the scans 1, 2, and 3 are being decoded (or processed), assuming that processing of scan 1, 2, and 3 are ahead of scan line 0; removing the dependencies on neighbors in scan lines 1, 2, and 3 enables scan line 0 to be processed sooner. FIG. 5 is an embodiment of a context dependency simplification with such that there are no dependencies within the same scan (removing G and K), and also reducing dependencies on neighbors that are located on different scan lines;

To avoid dependencies due to context updates, a different set of context models may be used for each scan line, such as, positions on scan 0 may have different contexts than position on scan 1 and 2. Note that the diagonals of the proposed fixed direction scan may be processed in parallel.

FIG. 6 is an embodiment of a context dependency simplification to reduce neighboring dependency to less than 11 neighbors (from 11 to 4). Simplification of context selection may also be independent of scan lines. For instance, using context selection, shown in FIG. 6, provides a good trade-off of complexity reduction and good coding gain.

Parallelism may also be achieved within the diagonal by pre-fetching data and performing speculative computations. Eliminating G and K, for example by removing dependency on the other positions within the same scan line, reduces the amount of speculative computation and fetching. The same holds true for vertical and horizontal scans. FIG. 7 is an embodiment of context dependency simplification (removal of B, F, C, G) for vertical scan to enable parallel processing within vertical scan line; while, FIG. 8 is an embodiment of a context dependency simplification (removal of H, I, J, K) for horizontal scan to enable parallel processing within horizontal scan line. FIG. 7 shows the reduced context dependency to enable easier parallel processing within the vertical scan line. FIG. 8 shows the reduced context dependency for easier parallel processing within horizontal scan lines.

In one embodiment, the characteristics of the significance map vary with slice type or coding unit type. Coding unit type indicates whether the pixel are inter predicted via pixels from other frames and intra predicted via pixels in the same frame. The context selection dependencies can be different depending on the slice or coding unit type. For instance, P and B slices, where the residual is small, could have much simpler context selection (i.e. less dependency) than I slices which tend to have larger residuals. Thus, not only the context is being adapted, but also the context selection method based on the slice/coding unit type. In such an embodiment, some slice/coding unit type are enabled to exploit very simple context selection methods.

Therefore, an embodiment may contain any or all of the following: diagonal scanning in fixed direction for of significance map, direction of the scan can depend on the last significant coefficient position, simplified context selection to reduced dependencies while maintaining most of the coding efficiency, using different sets of context models for adjacent (or all) scans, and/or using different context selection methods depending on the slice/coding unit type. As a result, parallel decoding of various binary symbols in the significance map can occur while maintaining high coding efficiency with dependencies in context selection.

FIG. 9 is a flow diagram depicting an embodiment of a method 900 for encoding bit code utilizing context dependency simplification to reduce the number of dependent scans. The method 900 retrieves 2 dimensional array of transform coefficient, which is transformed to a 1 dimensional coefficient scanning. The one dimensional array of transform coefficients is then utilized for context selection and binarization, which are used for arithmetic coding to generate the coded bits.

Figure 10:
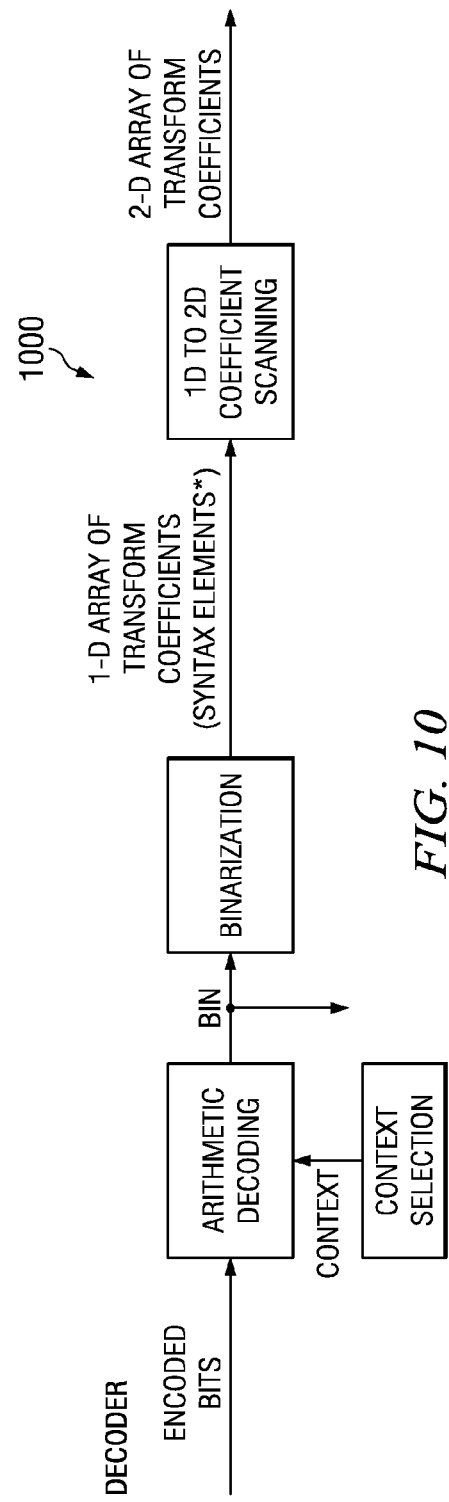
FIG. 10 is a flow diagram depicting an embodiment of a method for decoding bit code utilizing the diagonal scan in fixed direction along with context dependency simplification to reduce the number of dependencies to enable parallel context processing.

FIG. 10 is a flow diagram depicting an embodiment of a method 1000 for decoding bit code utilizing context dependency simplification to reduce the number of dependent scans. The method 1000 retrieves the encoded bits, for example, the encoded bits generated in FIG. 9, to perform arithmetic decoding. The arithmetic decoding generates binary symbols, which are utilized in binarization and in context selection. The context selection are routed back to the arithmetic decoding to generate binary symbols while maintaining high coding efficiency with dependencies in context selection. The binarization generates 1 dimensional array of transform coefficients or syntax elements, which utilized to transforming the 1 dimensional to a 2 dimensional coefficient scanning. Utilizing the two dimensional coefficient scanning generates a 2 dimensional transform coefficient.

Figure 11:
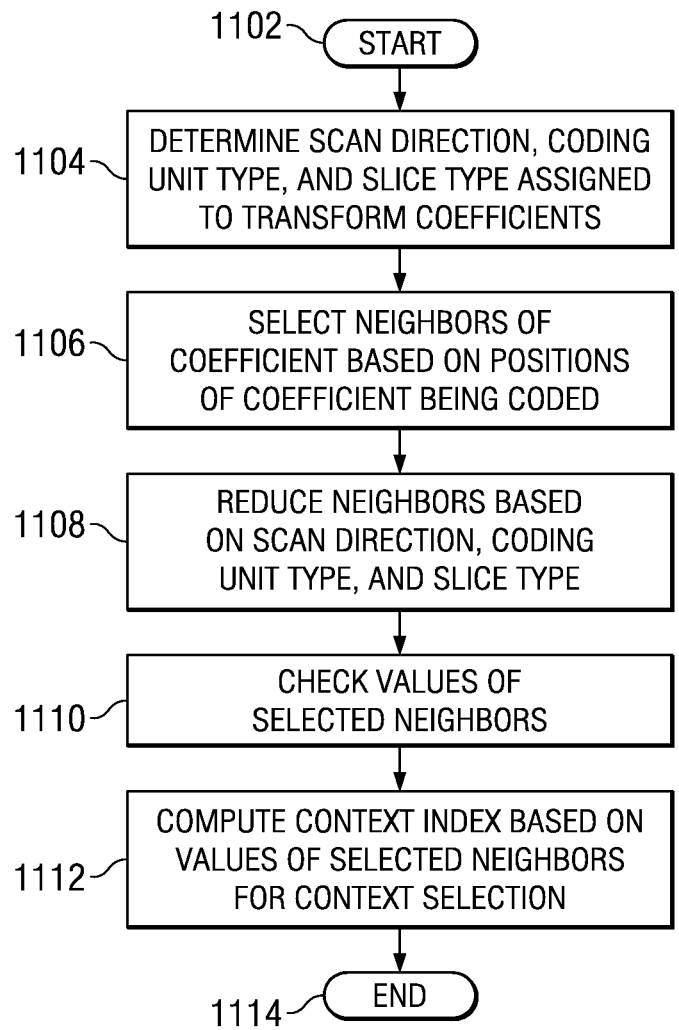
FIG. 11 is a flow diagram depicting an embodiment of a method for generating scan arrays.

FIG. 11 is a flow diagram depicting an embodiment of a method 1100 for reducing neighbor dependency in context selection. The method 1100 starts at step 1102 and proceeds to step 1104. At step 1104, the method 1100 determines the scan direction, slice type and/or coding unit type associated with the 2 dimensional transform coefficients. At step 1106, the method 1100 selects neighbors of coefficient based on position of coefficient being coded. At step 1108, the method 1100 reduces neighbors based on the scan direction, slice type and/or coding unit type and may not select neighbors found on the same scan line as the current position beginning processed. In one embodiment, the method 1100 may not reduce neighbors and directly proceeds to step 1110. At step 1110, the method 1100 checks the values of the selected neighbors. At step 1112, the method 1100 uses the values of the selected neighbors to compute a context index for context selection. The method 1100 ends at step 1114. The steps 1104, 1106, 1108 and/or 1110 may loop several times and may be performed in various orders to improve efficiency.

While the foregoing is directed to embodiments of the present invention, other and further embodiments of the invention may be devised without departing from the basic scope thereof, and the scope thereof is determined by the claims that follow.

What is claimed is:

1. A method of decoding video data comprising:
   receiving a stream of encoded bits;
   extracting a set of syntax elements from the encoded bits, the set of syntax elements comprising:
     an array location of a last significant coefficient in a block of transform coefficients;
     a significance map for the block of transform coefficients, the significance map representing the block of transform coefficients diagonally scanned in a fixed direction; and
     a series of additional syntax elements representing values of significant transform coefficients diagonally scanned in fixed direction;
   generating the block of transform coefficients using the extracted syntax elements; and
   performing an inverse transform using the block of transform coefficients to generate picture data.

2. The method of claim 1, extracting the set of syntax elements comprising:
   extracting a series of coeff_abs_level_greater1_flag, coeff_abs_level_greater2_flag, and coeff_sign_flag syntax elements.

3. The method of claim 1, extracting the series of additional syntax elements comprising:
   extracting a significant_coeffi_flag, a last_significant_coefficient_x, and last_significant_coefficient_y syntax elements.

4. The method of claim 1, comprising:
   determining the fixed direction based on a determination of a location of a last significant coefficient.

* * * * *